(No Model.)
J. L. LEVY.
EYEGLASSES.
No. 495,224. Patented Apr. 11, 1893.
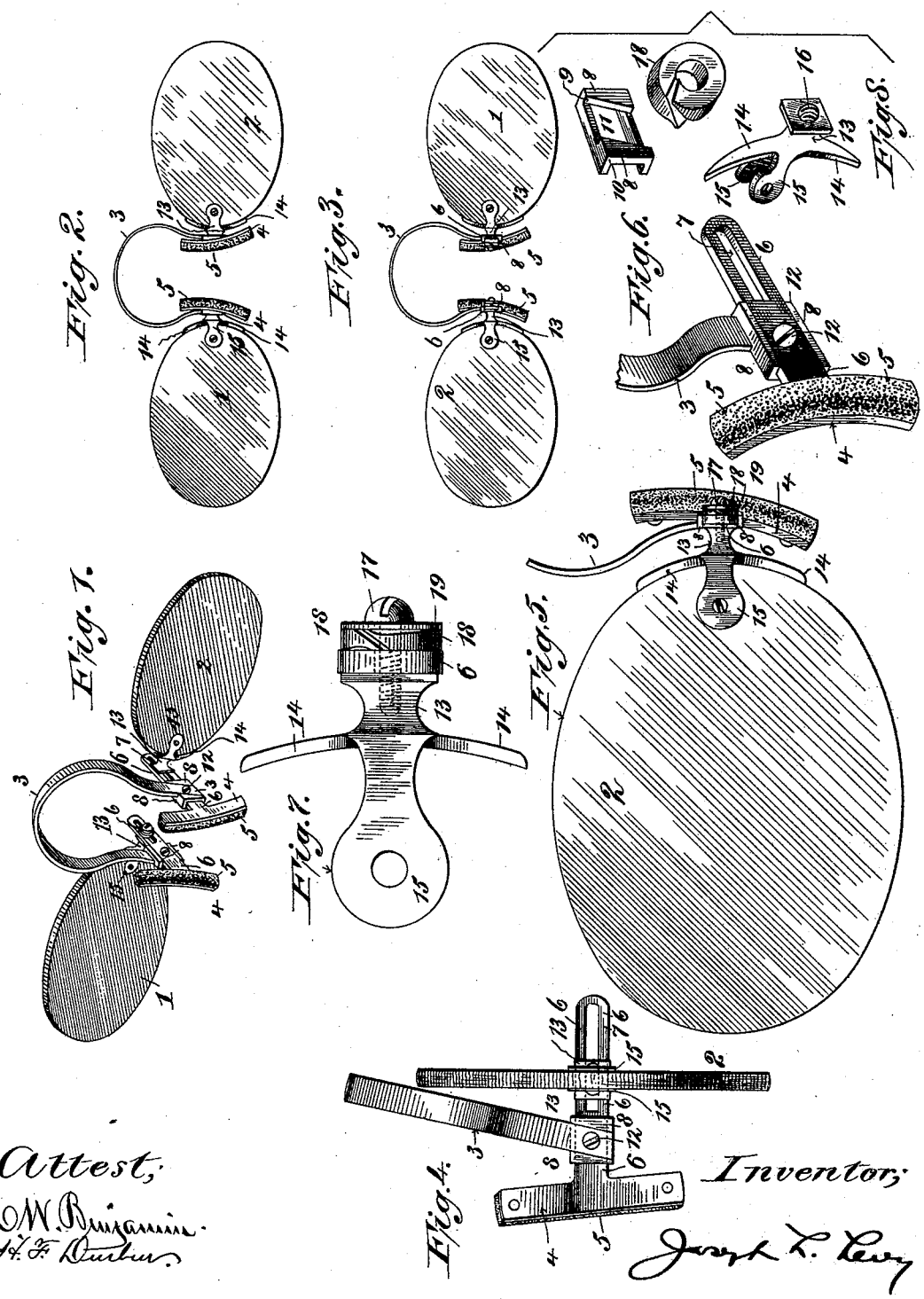

UNITED STATES PATENT OFFICE.

JOSEPH L. LEVY, OF NEW YORK, N. Y.

EYEGLASSES.

SPECIFICATION forming part of Letters Patent No. 495,224, dated April 11, 1893.

Application filed September 17, 1892. Serial No. 446,137. (No model.)

*To all whom it may concern:*

Be it known that I, JOSEPH L. LEVY, a citizen of the United States, residing at New York, in the county of New York and State of New York, have invented certain new and useful Improvements in Eyeglasses, of which the following is a specification.

My invention relates to frames for eyeglasses, and it has special reference to those structures whereby the lenses or glasses are securely supported upon the nose, and the adjustment thereof, both as regards the lenses in their relation to the eye, and the frame in relation to the structural character of the nose and face of the wearer, can be readily accomplished.

My invention has for its object to comprise in a single frame devices whereby the lenses may be adjusted in said frame on the line of vision, or at an angle thereto, without disturbing the integrity of the frame; that is to say, the structure for supporting both the lenses remains fixed and immovable, as to its collective parts, while the lenses are capable of the adjustment, as before stated, without disturbing the parts of the frame or changing the relation which those parts bear to the face.

Another important feature of my invention consists in the capability of independent adjustment, in the manner before stated, of each lens irrespective of the other, without disturbing the integrity of the frame; and another important feature of my invention lies in the capability of conforming the nose guard arms to the conformation of the nose, the particular use in this regard being the bringing of the nose guards closer together by a manipulation of the nose guard arms.

So far as the structure illustrated herein is concerned, additional merit is obtained by its cheapness, all the parts being easy of manufacture and without necessary complication, and the bow spring is not bent at the ends, it being made in one straight piece, such bending requiring in its manufacture additional steps, adding to its cost. The nose guard arms extend straight out from the nose guards, and occupy a position at right angles to the lens when the lens is disposed vertically, and they occupy throughout their entire length a position at right angles to the axis of the lenses, and a separate face plate, which determines the angle of the bow spring, is provided independent of the lens posts, and my construction not only enables the parts of the frame to be economically made, but the face plate, which insures the relative positions of the bow and nose guard arms, has this capacity, without delegating it to the lens posts.

By making the bow spring, the nose guards, and their arms stable in relation to each other, and locating the bow spring on the nose guard arms to the rear of the lenses and between them and the nose guards, the weight of the bow spring is sustained by the nose guards very close to the point where they grip the nose, and the question of preponderance of the weight thereof, and the liability of the frame moving away from the eye on account of this superposed weight is materially lessened.

My invention also consists of the improvements hereinafter fully described and pointed out in the claims.

In the drawings Figure 1 is a perspective view of an eyeglass frame with attached lenses, embodying the features of my invention; Fig. 2, a rear elevation of the eyeglass complete; and Fig. 3, a front elevation of the same; Fig. 4, an enlarged end elevation of the frame with attached lenses; Fig. 5, an enlarged front elevation of one lens, with the bow spring broken away; Fig. 6, an enlarged perspective view, showing the union of the nose guard arms and the bow spring; Fig. 7, an enlarged front elevation of the lens post and the retaining rim and arms which are secured to the lens, illustrating the method of securing the nose guard arms thereto, and the means, as hereinafter set forth, for fixing the lens in its desired position in relation to the nose guard arms. Fig. 8 illustrates the lens post and retaining rim and arms, the split pin and face plate, in perspective and enlarged.

Similar figures of reference refer to like parts throughout the several views.

In the drawings 1 and 2 are the lenses.

3 is the bow spring.

4 are the nose guards provided with the nose pads 5 of any suitable construction and material, having either a plain or serrated surface, and 6 are the nose guard arms, provided with a slot 7 extending longitudinally of the same.

To the nose guard arms 6 are secured face plates 8, having an obliquely and upwardly extending slot 9 on one side and a longitudinally extending slot 10 on the other side. See Fig. 8. An aperture 11 is provided in the face plate which passes through both slots. The face plates are preferably struck up from sheet material into the form shown in the drawings, (this method or any other being left to the option of the manufacturer) and it is very desirable, in order to get this part of the device light and as little bulky as possible, to make the slots 9 and 10 join each other, that is, one slot passing into the other as they cross, which will leave an opening 11 which passes entirely through the web of the face plate. The bow spring 3 lies in the slot 9 of the face plate, and the nose guard arm in the slot 10, and all are secured together by means of the pin 12 which passes through the nose guard arms, the aperture 11 of the face plate, and the end of the bow spring firmly uniting them together, and confining them in proper relation to each other.

It will be seen that the slot 10, in which the nose guard arms lie, is disposed in a horizontal plane, and the slot 9 in which the ends of the bow spring are secured, lies in a plane oblique to the plane of the slot 10, and that the relative position of these slots can be changed to alter the relation of these parts.

Owing to the distance in some cases of the eyes from the plane of the bridge of the nose at the upper portion thereof, it is often necessary that the nose guards be set farther away from the plane of the nose, and in doing this the bow spring will strike the upper portion of the bridge of the nose, preventing the glasses from being set at the proper distance from the eye. This difficulty has been obviated by disposing of the bow spring at an angle to the vertical plane of the lens, either by bending the bow spring itself, or by providing a part of the lens frame, such as the lens posts shown herein, with slots or guides, so as to dispose the bow spring at the desired angle. Both of these methods have their disadvantages: the bending of the bow spring as before set forth, causing a useless weight of material and extra labor in conforming the same; and in the second case, where it is desired to change the angle, an entirely new lens post with its slot or guide, conformed at a different angle must be used. By the use of the independent face plate the bow spring and the nose pads can be made to bear any angular relation to each other desired by simply changing the relation of the slots 9, 10 to each other.

The bow spring need not be made of malleable material (that is intended to be bent) but of resilient material, in the usual way, for the reason that it is only necessary to cause the bow spring to perform but one function in the present structure, to wit: that of pressing the nose pads to the face of the wearer. The reason for this is that I prefer to make the nose guard arms of malleable material, and get the necessary adjustment in this regard by bending them to or from each other, instead of bending the bow spring, and such bending can take place between the face plates and the nose guards, without affecting the parallelism of the slots in the nose guard arms to each other, nor the adjustability of the lenses therein.

I have by the construction before described provided for certain adjustments, and I shall now describe two further adjustments possible with my frame, which can be had without disturbing or altering the conformation of the frame from that given to it originally in any particular, and further without changing the position of the frame on the nose.

For securing the lenses to the frame the lens posts 13 are provided with the retaining rims 14 which embrace the end of the lens and which have the apertured fingers 15, by means of which the lens is secured thereto in the usual manner, as shown in the drawings. The end of the lens post 13 is squared and is provided with an interiorly screw threaded aperture 16 (Fig. 8) which is adapted to receive the screw 17.

The lens post and its appendages are old and well known, with the exception that the flanges at the side (which in the prior art, so far as I know, held the bow spring and determined its position) are eliminated, and instead of the lens, the lens post and appendages being a fixture of the frame, or being made to bear a constant relation to the bow spring, they are adjustable thereto, which adjustment is obtained by causing them to move within the slot 7, through which the screw 17 passes, and which provides independent axes for both of the lenses.

By reference to Fig. 7 it will be seen that the screw 17 passes through the slot 7 in the nose guard arm 6, and that the squared face of the lens post bears against one side of the nose guard arm, and between it and the enlarged head of the screw 17 is placed a split washer 18 having sharp edges at the point of severance, as shown clearly in Fig. 8, which split ring bears against a washer 19 which in turn bears against the enlarged head of the screw 17. This device enables each lens to be independently moved in the slot 7 of the nose guard arm on the line of vision, or in other words to or from the eye, and also permits of the rotation of the lens within the slot on the screw 17, in order to fix it at any desired angle to the line of vision (or the pupilary axis) of either one or both of the eyes; and when this adjustment has been secured the lenses can be secured in their proper position and permanently on the nose guard arm by turning the screw 17, which will cause the washer 19 to press the points of the split ring 18 into itself and into the nose guard arm, which will cause the position of the lens to remain permanent until again changed by releasing the split ring.

I have shown a considerable amount of adjustment of the lens in the nose guard arm, viz: by the length of the slot 7, but in some cases this amplitude of movement on the part of the lenses may be found to be a great deal more than necessary, and it is therefore apparent that the nose guard arms can be made of any desired length and the slot of any desired length, without departing from the spirit of my invention.

It is further apparent that the location of the face plates on the nose guard arm may be altered or changed in many ways without affecting the position of the lenses thereon.

I do not limit myself to the means shown herein for holding the lenses on the nose guard arms, as other devices can be employed.

It is further apparent that the main feature of my invention, to wit: the capability of adjustment of each lens either independently of the other or both together in the two ways before stated can be embodied in a device materially or substantially different from that shown herein without departing from the spirit or nature of my invention.

What I claim is—

1. In an eye-glass, the combination, with lenses, of a device for grasping the nose, as a nose clip, the lenses being adjustable in the line of vision or at an angle thereto, both or either of said adjustments being secured without changing the relation which the parts of the frame bear to each other, substantially as described.

2. The combination of an eye-glass frame, lenses supported thereon, having a movement about their longitudinal axes, means for securing the lenses at any point of said movement, and additional locking means therefor, substantially as described.

3. In an eye-glass, the combination of a supporting frame, and lenses movable in said frame on the line of vision without impairing the stability of said frame, substantially as described.

4. The combination with the bow spring, nose guard arms, and nose guards, of lenses supported by the nose guard arms and movable therein, substantially as described.

5. The combination with the bow spring, slotted nose guard arms secured to the bow spring and supported thereby, lenses mounted in said slots and movable therein, nose guards on the said arms, the bow spring being secured to the said arms between the lenses and nose guards, substantially as described.

6. The combination with the nose guard arms, of lenses, a bow spring, and an integral device having means for giving both the bow spring and arms the desired position in relation one to the other, and by which they are secured together, said means being independent of the lens clamps, posts or holders, substantially as described.

7. The combination with the nose guard arms, of lenses, a bow spring, and a block having grooved faces for securing the spring and arms together and giving them their desired inclination or position, the block being independent of any other portion of the frame, substantially as described.

8. The combination with the nose guard arms and bow spring, of the two way face plates uniting the said arms and spring, substantially as described.

9. The combination with the nose guard arms and the bow spring, of the two way face plates uniting said arms and spring, the said spring extending obliquely from the arms, substantially as described.

10. As an improvement in eye-glasses, the combination of nose guards, arms extending therefrom, lenses secured on the arms, and a bow spring secured on the arms between the nose guards and the points of attachment of the lenses, substantially as described.

11. As an improvement in eye-glasses, the combination of nose guards, arms extending therefrom, and a bow-spring secured to said arms, so as to make an oblique angle therewith at its point of attachment substantially as described.

12. A face plate having a longitudinal slot for securing the nose guard arm, and a transverse slot for securing the bow spring, substantially as described.

13. A face plate having a longitudinal slot for securing the nose guard arm on one side thereof, and a transverse slot for securing the bow spring on the other side, substantially as described.

14. A face plate having a longitudinal slot for securing the nose guard arm on one side thereof, and a transverse slot for securing the bow spring on the other side, said slots intersecting to form an aperture through the face plate, substantially as described.

15. As an improvement in eye-glasses, the combination of nose guard arms, and lenses adjustably mounted therein, each lens being adjustable independently of the other.

16. The combination with the slotted nose guard arm 7 of the lens post 13 having the fingers 15 and an internally screw-threaded aperture 16, the screw 17, and the split washer 18, and washer 19, substantially as described.

17. The combination with the nose guards and their arms, of lenses, a bow spring, means for securing the lenses to the arms, and independent means for securing the bow spring to the arms, substantially as described.

18. As an improvement in eye-glasses, the combination of nose guards having arms depressed at a slightly oblique angle from the nose guards, and a bow spring supported on said arms also at a slightly oblique angle, substantially as described.

19. As an improvement in eye-glasses, the combination of nose guards, arms extending therefrom, and a bow spring secured obliquely to said arms, the lenses being secured on the continuations of said arms, substantially as described.

20. The combination with the bow spring 3, of the nose guards having the arms 6, slots 7 in the arms, the spring being secured to the arms between the slots and guards, and the lenses adjustably secured in said slots, substantially as described.

21. In an eye-glass, the combination of a forwardly slanting spring, and a pair of rearwardly slanting noseguards acted on by said spring, with lenses supported thereby, said lenses being adjustable without altering the relation of said spring and noseguards, substantially as described.

Signed in the city, county, and State of New York this 16th day of September, 1892.

JOSEPH L. LEVY.

Witnesses:
B. S. WISE,
H. F. DURBUR.